United States Patent
Park

(10) Patent No.: US 10,162,231 B2
(45) Date of Patent: Dec. 25, 2018

(54) LIQUID CRYSTAL DISPLAY DEVICE

(71) Applicant: LG Display Co., Ltd., Seoul (KR)

(72) Inventor: Du-Hwan Park, Ulsan (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 15/376,332

(22) Filed: Dec. 12, 2016

(65) Prior Publication Data

US 2017/0176819 A1 Jun. 22, 2017

(30) Foreign Application Priority Data

Dec. 18, 2015 (KR) .......................... 10-2015-0182125

(51) Int. Cl.
*G02F 1/1343* (2006.01)

(52) U.S. Cl.
CPC ............... *G02F 1/134363* (2013.01)

(58) Field of Classification Search
None
See application file for complete search history.

(56) References Cited

U.S. PATENT DOCUMENTS

| 8,432,522 | B2 * | 4/2013 | Mori | G02F 1/134309 349/106 |
| 2008/0062339 | A1 * | 3/2008 | Sekime | G02F 1/133753 349/33 |
| 2012/0056915 | A1 * | 3/2012 | Shibazaki | G02F 1/133371 345/690 |
| 2014/0152934 | A1 * | 6/2014 | Huh | G02F 1/133707 349/43 |
| 2015/0212374 | A1 * | 7/2015 | Uejima | G02F 1/134309 349/43 |
| 2016/0086553 | A1 * | 3/2016 | Sato | G09G 3/3607 345/88 |
| 2016/0216566 | A1 * | 7/2016 | Park | G02F 1/133753 |
| 2016/0370661 | A1 * | 12/2016 | Ono | G02F 1/134309 |

FOREIGN PATENT DOCUMENTS

KR    10-2010-0046826 A1    5/2010

* cited by examiner

*Primary Examiner* — Ryan Crockett

(74) *Attorney, Agent, or Firm* — Fenwick & West LLP

(57) ABSTRACT

Provided is a liquid crystal display device. The liquid crystal display device includes: a first pixel electrode of which at least a part is extended in a first direction; and a second pixel electrode of which at least a part is extended in a second direction different from the first direction. The first pixel electrode and the second pixel electrode are included in the same pixel and respectively disposed in different sub-pixels. According to the present disclosure, pixel electrodes having different tilt angles are used in sub-pixels, respectively. Thus, it is possible to minimize a difference in response speed between sub-pixels when various colors are displayed.

15 Claims, 8 Drawing Sheets

| Average | Rising Time (µs) | | | | | | | |
|---|---|---|---|---|---|---|---|---|
| | G255 | G223 | G191 | G159 | G127 | G95 | G63 | G31 | G0 |
| G255 | | 11.7 | 11.4 | 11.6 | 11.7 | 11.8 | 12.2 | 12.8 | 13.3 |
| G223 | | | 16.6 | 16.1 | 16.8 | 17.5 | 18.4 | 19.3 | 19.1 |
| G191 | | | | 20.0 | 20.6 | 21.1 | 22.6 | 23.5 | 23.7 |
| G159 | | | | | 23.2 | 24.4 | 25.5 | 27.0 | 27.1 |
| G127 | | | | | | 24.3 | 27.0 | 29.0 | 29.7 |
| G95 | | | | | | | 27.3 | 28.2 | 29.0 |
| G63 | | | | | | | | 26.4 | 27.8 |
| G31 | | | | | | | | | 22.2 |
| G0 | | | | | | | | | |
| | | | | | | Aver | 19.3 | Max | 29.7 |

Rrising (top row), Grising (G191 row), Brising (G63 row)

FIG. 1B

PRIOR ART

LIQUID CRYSTAL DISPLAY DEVICE

CROSS-REFERENCE TO RELATED APPLICATIONS

This application claims the priority of Republic of Korea Patent Application No. 10-2015-0182125 filed on Dec. 18, 2015, in the Korean Intellectual Property Office, the disclosure of which is incorporated herein by reference.

BACKGROUND

Field

The present disclosure relates to a liquid crystal display device and more particularly, to a liquid crystal display device which is improved in color display quality by minimizing a difference in response speed between sub-pixels.

Description of the Related Art

A liquid crystal display device is a display device including a liquid crystal layer. The liquid crystal display device is driven by adjusting a transmittance of light from a light source such as a backlight unit. In recent years, a demand for a liquid crystal display device with high resolution and low power consumption has increased.

The liquid crystal display device includes a plurality of pixels and a plurality of pixel electrodes configured to drive the plurality of pixels. If a pixel driving voltage is applied to the pixel electrodes, liquid crystal molecules in the liquid crystal layer are rotated due to a voltage difference between the pixel driving voltage and a common voltage applied to a common electrode. The amount of light to be transmitted is changed according to the degree of rotation of the liquid crystal molecules, and, thus, an image is displayed. In this regard, the pixel electrodes may be arrayed in various patterns, and an array pattern may affect the characteristics of the liquid crystal display device.

FIG. 1A is a plane view provided to explain a conventional liquid crystal display device. FIG. 1A illustrates components within a pixel including a red sub-pixel R, a green sub-pixel G, and a blue sub-pixel B. Referring to FIG. 1A, the conventional liquid crystal display device includes a data line 10, a gate line 20, a gate electrode 30, a source electrode 40, a drain electrode 50, and a pixel electrode 60R in the exemplary red sub-pixel R. The data line 10 transfers a data signal, and the gate line 20 transfers a scan signal for operating a thin film transistor. A channel is formed between the source electrode 40 and the drain electrode 50 and transfers the data signal to the pixel electrode 60R connected to the drain electrode 50 through a hole H in response to the scan signal.

The pixel electrode 60R is divided into three parts from a portion connected to the drain electrode 50 and extended as being tilted at a certain angle. Further, the pixel electrode 60R divided into three parts is titled again in a symmetrical direction and electrically connected. Thus, the pixel electrode 60R is not formed into a straight line, but tilted and extended. In the conventional liquid crystal display device, pixel electrodes 60R, 60G, and 60B on the respective sub-pixels R, G, and B have the same tilt angle. In other words, the pixel electrodes 60R, 60G, and 60B disposed on the red sub-pixel R, the green sub-pixel G, and the blue sub-pixel B, respectively, have the same shape with substantially the same tilt angle.

FIG. 1B is a table provided to explain a liquid crystal rotation time in the conventional liquid crystal display device. The table in FIG. 1B shows rotation times of liquid crystals when a voltage for displaying a specific gray scale is shifted to a voltage for displaying another specific gray scale. Herein, gray scales on the X-axis are initial gray scales, and gray scales on the Y-axis are changed gray scales. Values in the table represent the time required for a change from an initial gray scale to a changed gray scale.

Referring to FIG. 1B, in the conventional liquid crystal display device, it takes 13.3 µs for a change from an initial gray scale G0, i.e., black gray scale, to a gray scale G255. Further, it takes 23.7 µs for a change from the initial gray scale G0 to a gray scale G191 and 27.8 µs for a change from the initial gray scale G0 to a gray scale G63. As a difference in gray scale is increased, a difference in data voltage to be applied is increased and thus liquid crystals can be rotated at a higher speed. In a liquid crystal display device, at least three sub-pixels are disposed in one pixel, and the three sub-pixels can be controlled to respectively display different gray scales. Further, when a gray scale of a pixel is changed, a liquid crystal rotation time may affect a color display quality.

In order to inspect a color display quality of a liquid crystal display device, various methods may be used. For example, there may be used a method of applying a specific pattern to pixels and inspecting whether a desired color can be recognized without incongruity. FIG. 1C provides schematic diagrams to explain a change of pixels in the conventional liquid crystal display device.

(a) of FIG. 1C illustrates a plurality of exemplary pixels, and illustrates pixels PXL1 of a specific color with an RGB value of, e.g., (255, 191, 63) and pixels PXL2 in black state with an RGB value of, e.g., (0, 0, 0). Herein, a pattern that enables the pixels PXL2 in black state to have the color with the RGB value (255, 191, 63) may be applied.

Desirably, the pixels PXL2 need to be immediately changed to pixels of the color with the RGB value (255, 191, 63). However, as described above with reference to FIG. 1B, a liquid crystal rotation time is different in each sub-pixel. Therefore, a specific color is displayed first. In FIG. 1B, "Rrising" denotes a time required for a rotation of liquid crystals in a red sub-pixel, and the time is about 13 µs. Further, "Grising" which denotes a time required for a rotation of liquid crystals in a green sub-pixel is about 23 µs, and "Brising" which denotes a time required for a rotation of liquid crystals in a blue sub-pixel is about 27 µs. Accordingly, referring to (b) of FIG. 1C, only the red sub-pixel transmits a red light during a period between 13 µs and 23 µs. Referring to (c) of FIG. 1C, after about 24 µs, all the liquid crystals in the blue sub-pixel and the green sub-pixel are rotated, and, thus, a desired color can be recognized.

About 14 µs is a short period of time, but a time difference of about 8 µs or more can be recognized by the human eye. Therefore, if pixels are changed from a black state to a color having a specific gray scale, a color for liquid crystals rotated first is recognized first. If such a change in gray scale continuously occurs, tailing occurs.

SUMMARY

A difference in liquid crystal rotation times between sub-pixels of a color having a specific gray scale has been increased and a difference in response speed has been increased accordingly. Thus, a demand for minimizing a response speed between sub-pixels has been increased.

In this regard, the inventors of the present disclosure recognized that a shape of a pixel electrode included in a sub-pixel can change a liquid crystal rotation time. Further, the inventors of the present disclosure recognized that a difference in liquid crystal rotation time can be reduced by extending pixel electrodes in sub-pixels in different directions, respectively.

An object to be achieved by the present disclosure is to provide a liquid crystal display device having a novel pixel electrode structure within a sub-pixel to reduce a difference in liquid crystal rotation times between sub-pixels and thus minimize a difference in response speed between sub-pixels.

Another object to be achieved by the present disclosure is to provide a liquid crystal display device which has a high reliability even with a novel pixel electrode structure configured to minimize a difference in response speed between sub-pixels.

The objects of the present disclosure are not limited to the aforementioned objects, and other objects, which are not mentioned above, will be apparent to a person having ordinary skill in the art from the following description.

According to an aspect of the present disclosure, there is provided a liquid crystal display device. The liquid crystal display device includes: a first pixel electrode of which at least a part is extended in a first direction; and a second pixel electrode of which at least a part is extended in a second direction different from the first direction. The first pixel electrode and the second pixel electrode are included in the same pixel and respectively disposed in different sub-pixels.

According to another aspect of the present disclosure, there is provided a liquid crystal display device. The liquid crystal display device includes: a pixel array including a plurality of pixels with a plurality of sub-pixels; and a color filter corresponding to the pixel array. Each of the plurality of sub-pixels includes a pixel electrode extended in a direction determined in order for at least some of the plurality of sub-pixels to respectively have different liquid crystal rotation times when the same voltage is applied.

Details of other exemplary embodiments will be included in the detailed description of the invention and the accompanying drawings.

According to the present disclosure, pixel electrodes having different tilt angles are used in sub-pixels, respectively. Thus, it is possible to minimize a difference in response speed between sub-pixels when various colors are displayed.

Further, according to a changed tilt angle of a pixel electrode, the other components are configured corresponding to the pixel electrode. Thus, it is possible to maintain the characteristics required for a liquid crystal display device even though a pixel electrode configured to minimize a difference in response speed between sub-pixels.

The effects of the present disclosure are not limited to the aforementioned effects, and various other effects are included in the present specification.

BRIEF DESCRIPTION OF THE DRAWINGS

The above and other aspects, features and other advantages of the present disclosure will be more clearly understood from the following detailed description taken in conjunction with the accompanying drawings, in which:

FIG. 1B is a table provided to explain a liquid crystal rotation time in the conventional liquid crystal display device;

DETAILED DESCRIPTION OF THE EMBODIMENT

Figure 1A:
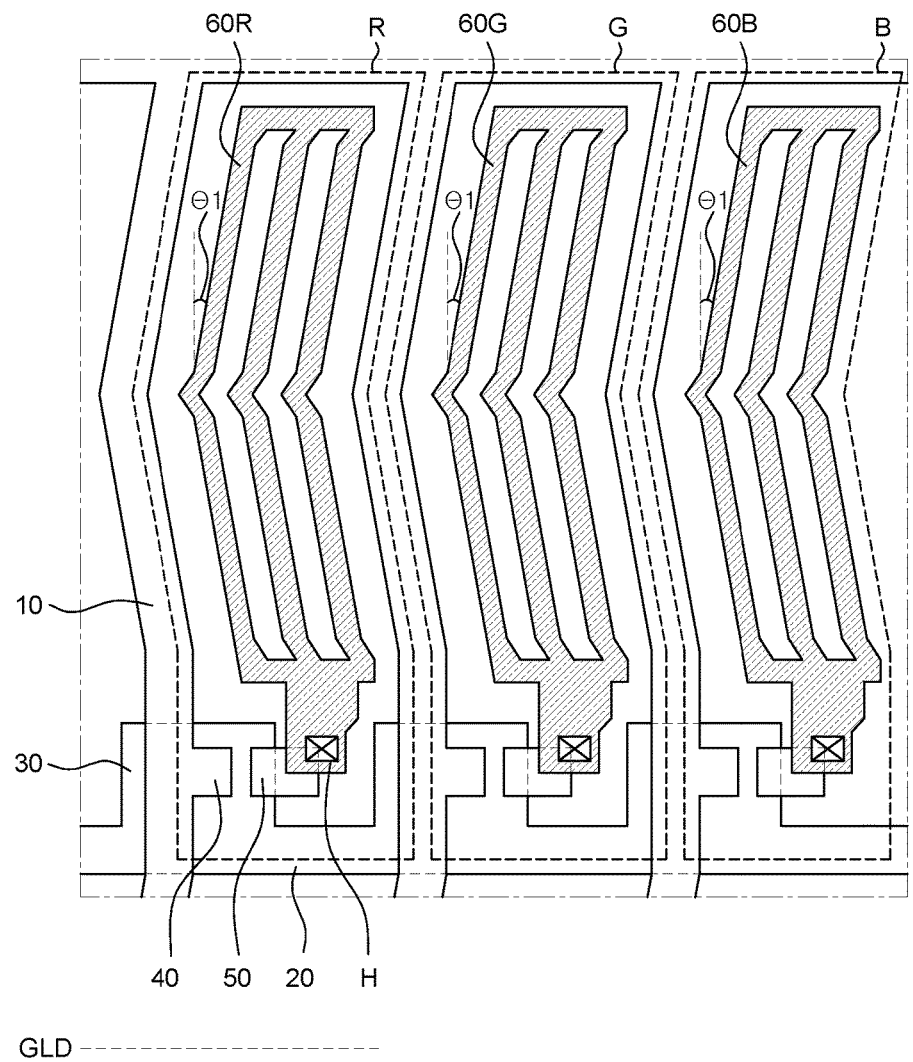
FIG. 1A is a schematic plane view provided to explain a conventional liquid crystal display device.
Figure 1C:
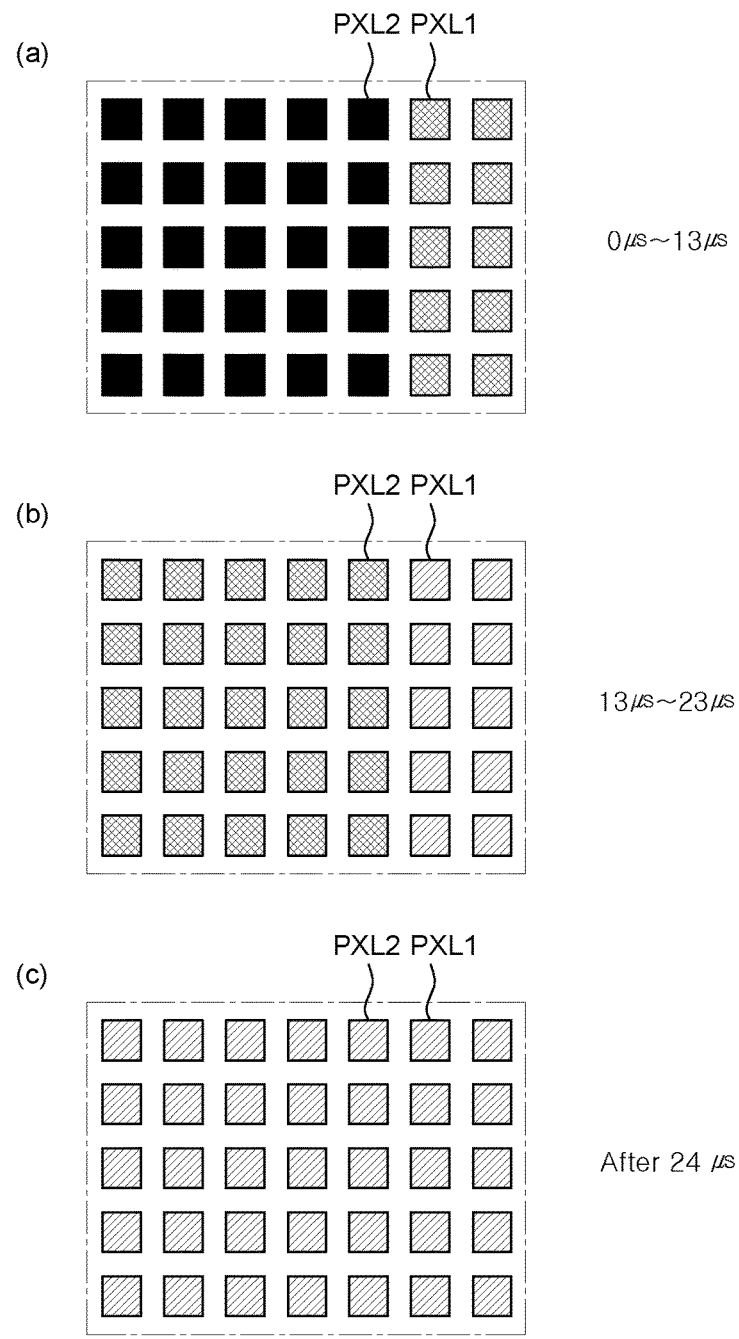
FIG. 1C provides schematic diagrams to explain a change of pixels in the conventional liquid crystal display device.

Advantages and features of the present disclosure, and methods for accomplishing the same will be more clearly understood from exemplary embodiments described below with reference to the accompanying drawings. However, the present disclosure is not limited to the following exemplary embodiments but may be implemented in various different forms. The exemplary embodiments are provided only to complete disclosure of the present disclosure and to fully provide a person having ordinary skill in the art to which the present disclosure pertains with the category of the invention, and the present disclosure will be defined by the appended claims.

The shapes, sizes, ratios, angles, numbers, and the like shown in the accompanying drawings for describing the exemplary embodiments of the present disclosure are merely examples, and the present disclosure is not limited thereto. Like reference numerals generally denote like elements throughout the present specification. Further, in the following description, a detailed explanation of well-known related technologies may be omitted to avoid unnecessarily obscuring the subject matter of the present disclosure. The terms such as "including," "having," and "consist of" used herein are generally intended to allow other components to be added unless the terms are used with the term "only". Any references to singular may include plural unless expressly stated otherwise.

Components are interpreted to include an ordinary error range even if not expressly stated.

When the position relation between two parts is described using the terms such as "on", "above", "below", and "next", one or more parts may be positioned between the two parts unless the terms are used with the term "immediately" or "directly".

When an element or layer is referred to as being "on" another element or layer, it may be directly on the other element or layer, or intervening elements or layers may be present.

Although the terms "first", "second", and the like are used for describing various components, these components are not confined by these terms. These terms are merely used for distinguishing one component from the other components. Therefore, a first component to be mentioned below may be a second component in a technical concept of the present disclosure.

Throughout the whole specification, the same reference numerals denote the same elements.

Since size and thickness of each component illustrated in the drawings are represented for convenience in explanation, the present disclosure is not necessarily limited to the illustrated size and thickness of each component.

The features of various embodiments of the present disclosure can be partially or entirely bonded to or combined with each other and can be interlocked and operated in technically various ways, and the embodiments can be carried out independently of or in association with each other.

Hereinafter, various exemplary embodiments of the present disclosure will be described in detail with reference to the accompanying drawings.

Figure 2:
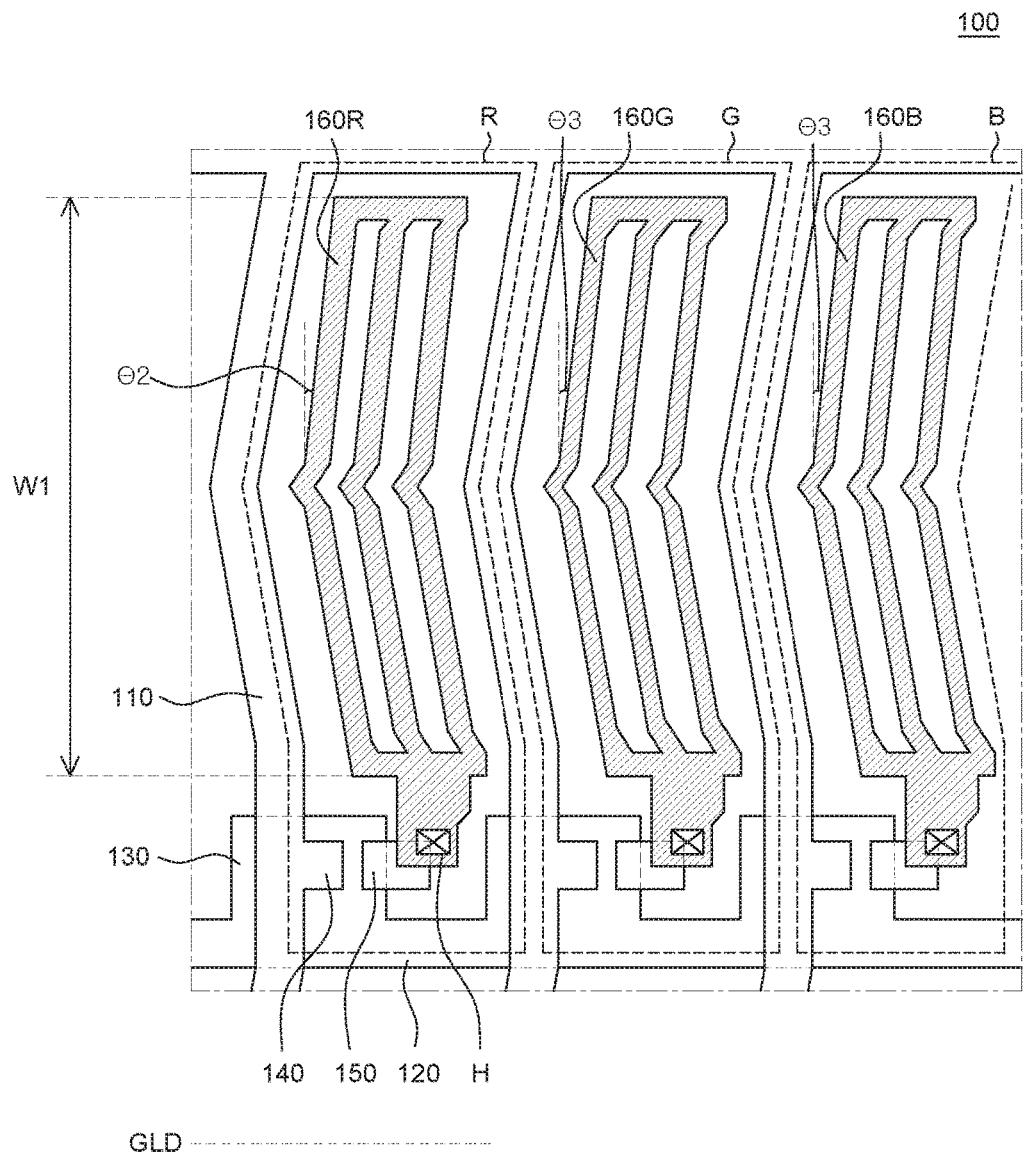
FIG. 2 is a plane view of a liquid crystal display device according to an exemplary embodiment of the present disclosure.

FIG. 2 is a plane view of a liquid crystal display device according to an exemplary embodiment of the present disclosure. In FIG. 2, illustration of an upper substrate on which a color filter is disposed, a liquid crystal layer, a common electrode, and an alignment film is omitted for brevity of illustration. A liquid crystal display device 100 according to an exemplary embodiment of the present disclosure includes a pixel array including a plurality of pixels. One of the plurality of pixels in the pixel array includes a red sub-pixel R, a green sub-pixel G, and a blue sub-pixel B. Referring to FIG. 2, three sub-pixels R, G, and B constituting one pixel are illustrated. The liquid crystal display device 100 includes a plurality of data lines 110, a plurality of gate lines 120, a gate electrode 130 protruded from the gate line 120, a source electrode 140 protruded from the data line 110, an active layer, a drain electrode 150, and a pixel electrode 160R in one sub-pixel.

Referring to FIG. 2, the pixel electrode 160R is connected to the drain electrode 150 through a hole H. The pixel electrode 160R has a length W1 in a direction orthogonal to a direction GLD of the gate line 120. The length W1 of the pixel electrode 160R in the direction orthogonal to the direction GLD of the gate line is the same for the sub-pixels R, G, and B. The pixel electrode 160R is extended in the direction orthogonal to the direction GLD of the gate line 120 and then tilted and extended again. The reason why the pixel electrode 160R is tilted and extended is to provide directionality to the liquid crystals. Further, if the pixel electrode 160R is tilted and extended, it may affect a transmittance and a response speed.

The liquid crystal display device 100 according to an exemplary embodiment of the present disclosure has a structure in which if one sub-pixel is tilted at a specific angle, another sub-pixel is tilted at an angle different from the specific angle. In other words, the liquid crystal display device 100 includes the pixel electrode 160R of which at least a part is extended in a specific direction in one sub-pixel and also includes a pixel electrode 160G of which at least a part is extended in a direction different from the specific direction in another sub-pixel. Referring to FIG. 2, the pixel electrode 160R of the red sub-pixel R is tilted at an angle of Θ2 on the basis of a line orthogonal to the direction GLD of the gate line 120 and then extended. Meanwhile, pixel electrodes 160G and 160B in the green sub-pixel G and the blue sub-pixel B, respectively, are tilted at an angle of Θ3 on the basis of the line orthogonal to the direction GLD of the gate line 120 and then extended.

A tilt angle of a pixel electrode affects a rotation time of liquid crystals disposed on the pixel electrode.

$$|T|=\Delta\varepsilon\cdot\sin 2\theta_x\cdot E^2 \quad \text{[Equation 1]}$$

Herein, |T| denotes a liquid crystal rotation time, Δε denotes a difference in dielectric constant between a major axis direction and a minor axis direction, $\theta_x$ denotes a tilt angle on the basis of a line orthogonal to the direction GLD, and E denotes an electric field vector. According to Equation 1, as a tilt angle is increased, the amount of electric energy to be applied to liquid crystals is increased, and, thus, a liquid crystal rotation time is decreased.

In the liquid crystal display device 100 according to an exemplary embodiment of the present disclosure, an extension direction of a pixel electrode in a sub-pixel is determined on the basis of Equation 1. If an extension direction of a pixel electrode is determined to be different in each sub-pixel, a liquid crystal rotation time is different in each sub-pixel. Thus, a response speed of each sub-pixel in one pixel can be adjusted.

Further, a tilt angle of a pixel electrode is determined to be relative to each other among sub-pixels. In order to reduce red tailing, liquid crystal rotation times of the green sub-pixel G and the blue sub-pixel B may be reduced. That is, a tilt angle of the pixel electrode 160R in the red sub-pixel R may be smaller than a tilt angle of the pixel electrode 160G or 160B in the green sub-pixel G or the blue sub-pixel B, respectively. Therefore, a liquid crystal rotation time of the red sub-pixel R may be set to be substantially the same as liquid crystal rotation times of the green sub-pixel G and the blue sub-pixel B at a specific color gray scale. Herein, when liquid crystal rotation times are substantially the same, for example, a difference in liquid crystal rotation time among the sub-pixels R, G, and B may be 8 μs or less at a specific color gray scale.

Referring to FIG. 2, the pixel electrode 160R in the red sub-pixel R may be extended in a direction tilted at about 10 degrees from the direction orthogonal to the direction GLD of the gate line 120. The pixel electrode 160G in the green sub-pixel G adjacent to the red sub-pixel R may be extended in a direction titled at about 15 degrees from the direction orthogonal to the direction GLD of the gate line 120. Further, the pixel electrode 160B in the blue sub-pixel B may also be extended in a direction titled at about 15 degrees. However, the present disclosure is not limited thereto. A difference in tilt angle among the pixel electrodes 160R, 160G, and 160B may be from 3 degrees to 7 degrees. If a difference in tilt angle is smaller than 3 degrees, there is not a big difference in liquid crystal rotation time. If a difference in tilt angle is greater than 7 degrees, the difference in tilt angle causes a change in transmittance and storage capacitance Cst. Thus, such differences are difficult to be applied.

The liquid crystal display device 100 according to an exemplary embodiment of the present disclosure illustrated in FIG. 2 in which all pixel electrodes in respective sub-pixels R, G, and B are extended in a direction tilted at about 15 degrees, has shorter liquid crystal rotation times in the green sub-pixel G and the blue sub-pixel B than a conventional liquid crystal display device in which all pixel electrodes in respective sub-pixels R, G, and B are extended in a direction tilted at about 10 degrees. Accordingly, for example, when a color of a pixel is changed from black to a color with a relatively high ratio of red, red tailing can be reduced.

In the exemplary embodiment illustrated in FIG. 2, red tailing has been described as an example. However, the present disclosure is not limited thereto. The structure of the present disclosure can be used to remove various defects caused by a difference in response speed among the sub-pixels R, G, and B. Further, according to an exemplary embodiment of the present disclosure, if the green sub-pixel and the blue sub-pixel have higher response speeds than the red sub-pixel, it is observed that a user's visual sensation is maintained when a gray scale or another color is displayed.

Figure 3A:
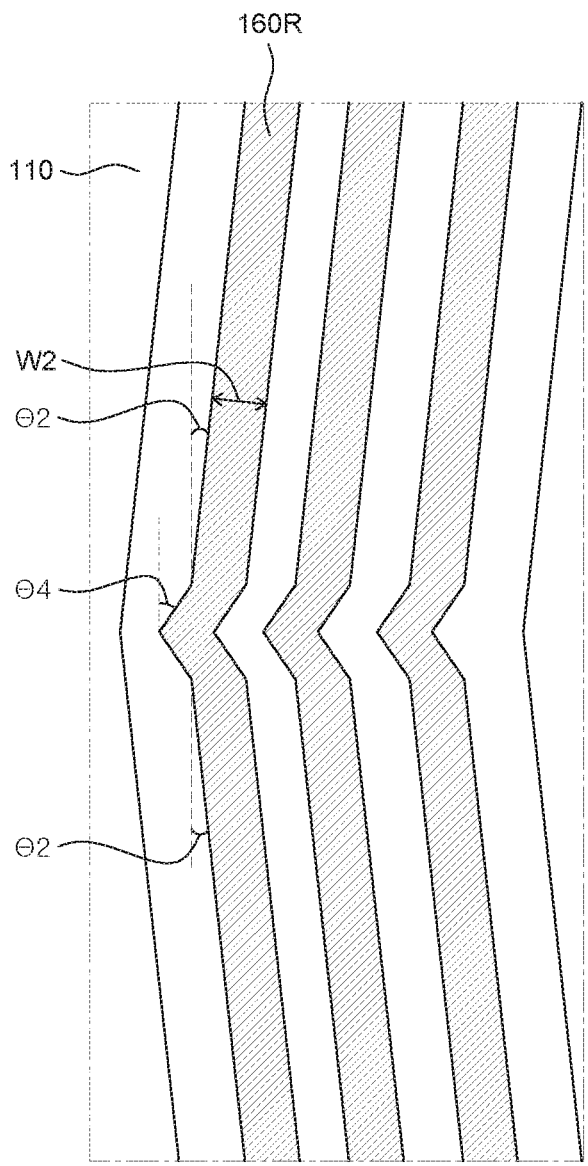
FIG. 3A is an enlarged plane view illustrating a pixel electrode disposed in one sub-pixel of the liquid crystal display device according to an exemplary embodiment of the present disclosure.
Figure 3B:
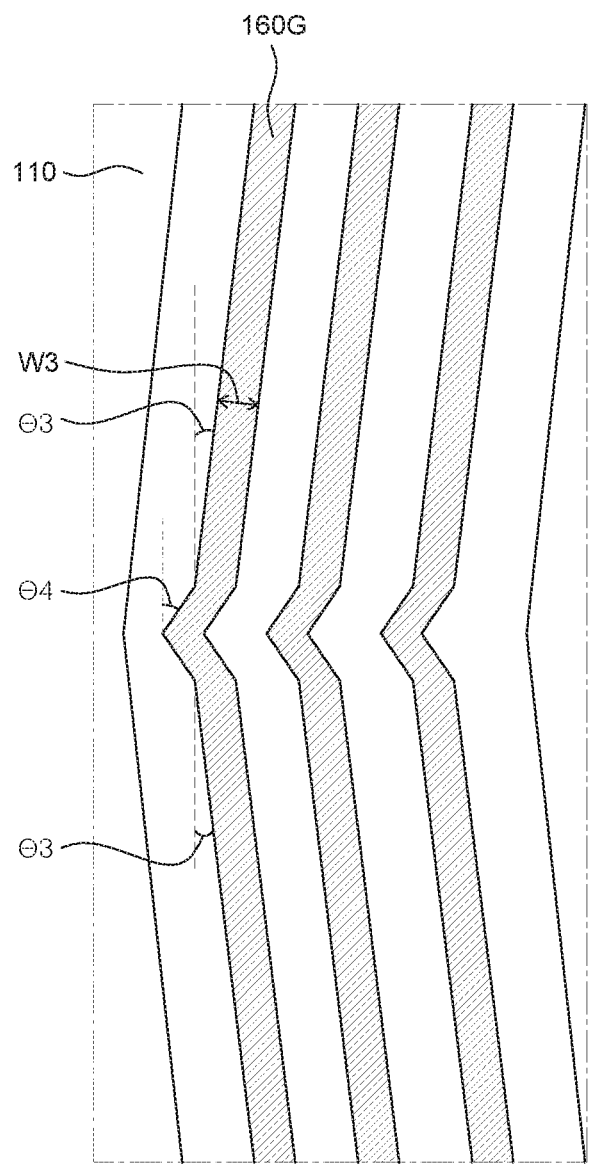
FIG. 3B is an enlarged plane view illustrating a pixel electrode disposed in another one sub-pixel of the liquid crystal display device according to an exemplary embodiment of the present disclosure.

Hereinafter, a structure of the pixel electrode 160R and 160G will be described in detail with reference to FIG. 3A and FIG. 3B, respectively. FIG. 3A is an enlarged plane view illustrating the pixel electrode 160R disposed in the red sub-pixel R which is one sub-pixel of the liquid crystal display device according to an exemplary embodiment of the present disclosure. FIG. 3B is an enlarged plane view illustrating the pixel electrode 160G disposed in the green sub-pixel G which is another one sub-pixel of the liquid crystal display device 100 according to an exemplary embodiment of the present disclosure.

Referring to FIG. 3A, the pixel electrode 160R of the red sub-pixel R includes a first sub-electrode tilted at Θ2 on the basis of the direction orthogonal to the direction GLD of the gate line and then extended as described above. Further, the pixel electrode 160R of the red sub-pixel R includes a second sub-electrode extended in a direction symmetrical to the extension direction of the first sub-electrode on the basis of the direction GLD parallel with the gate line. Furthermore, a ←shaped connection sub-electrode connects the first sub-electrode and the second sub-electrode.

Referring to FIG. 3B, the pixel electrode 160G of the green sub-pixel G includes a first sub-electrode tilted at Θ3 on the basis of the direction orthogonal to the direction GLD of the gate line and then extended. Further, the pixel electrode 160G of the green sub-pixel G includes a second sub-electrode extended in a direction symmetrical to the direction tilted at 83 on the basis of the direction GLD parallel with the gate line. Furthermore, a ←shaped connection sub-electrode connects the first sub-electrode and the second sub-electrode.

The connection sub-electrode is tilted at 84 from the direction GLD orthogonal to the gate line and has the same tilt angle Θ4 in the red sub-pixel R, the green sub-pixel G, and the blue sub-pixel B.

The conventional liquid crystal display device includes pixel electrodes extended in the same pattern with the same tilt angle in order for sub-pixels to have the same characteristics. However, in the liquid crystal display device 100 according to an exemplary embodiment of the present disclosure, although the pixel electrodes 160R, 160G, and 160B in the sub-pixels have different tilt angles, the sub-pixels have the same characteristics.

If there is a difference in tilt angle among the sub-pixels R, G, and B, there may be non-uniformity in Cst. In the liquid crystal display device 100 according to an exemplary embodiment of the present disclosure, the pixel electrodes 160R, 160G, and 160B have the same area in order for the sub-pixels R, G, and B to have a uniform Cst even with a difference in tilt angle. If the pixel electrodes 160G and 160B have the same area but the tilt angles thereof are increased while maintaining the length perpendicular to the length (W1 in FIG. 2), a length (W1 in FIG. 2) of the pixel electrode 160G is reduced. In this case, the locations of thin film transistors in the specific sub-pixels may be moved according to the pixel electrodes 160G and 160B. Therefore, there may be non-uniformity in parasitic capacitance Cdp between the pixel electrodes and data lines. To suppress such a problem, referring to FIG. 3A and FIG. 3B, widths W2 and W3 of the respective pixel electrodes 160R, 160G, and 160B are adjusted to be different from each other, so that the pixel electrodes 160R and 160G have the same size and the same length W1. For example, the width W2 of the pixel electrode 160R in the red sub-pixel R of FIG. 3A is smaller than the width W3 of the pixel electrode 160G in the green sub-pixel G. Since the same length W1 is maintained, a portion where the pixel electrodes 160R and 160G are respectively connected to thin film transistors may have the same structure in the sub-pixels R and G. Although the pixel electrodes 160R and 160G in the sub-pixels R and G have different tilt angles, Cdp, transistor charging characteristics and the like may not be affected. Further, although the pixel electrodes 160R and 160G have different tilt angles, the pixel electrodes 160R and 160G have the same size and the same length. Thus, Cst can be kept uniform between the sub-pixels.

Figure 4:
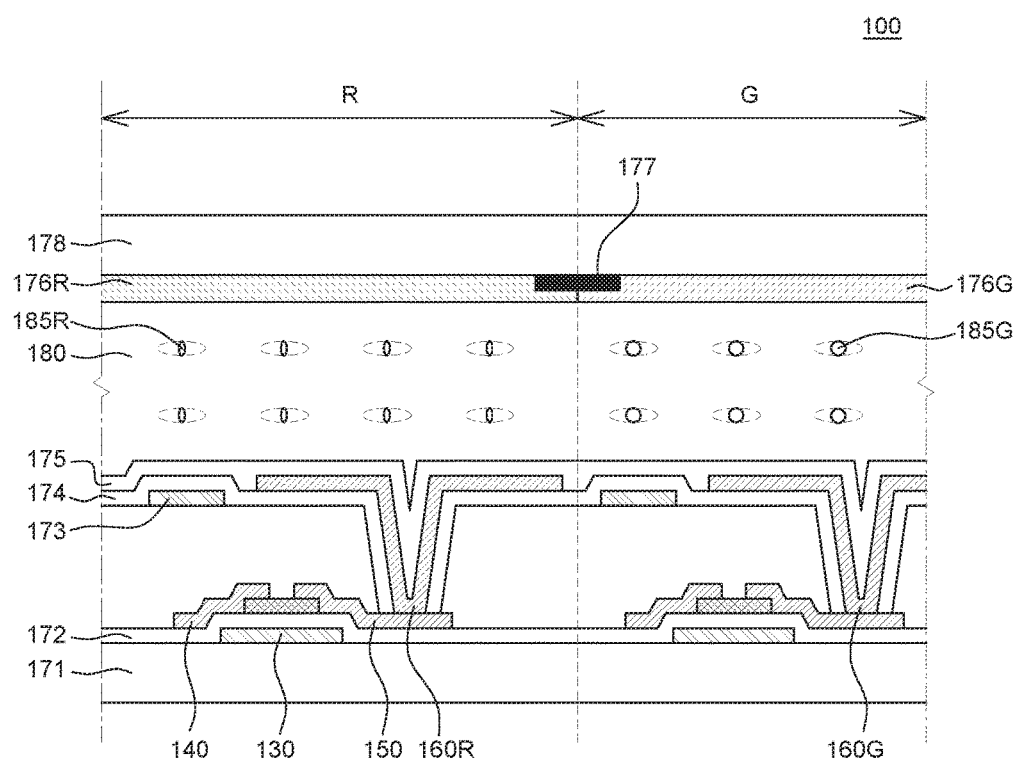
FIG. 4 is a schematic cross-sectional view provided to explain a rotation of liquid crystals in the liquid crystal display device according to an exemplary embodiment of the present disclosure.

FIG. 4 is a schematic cross-sectional view provided to explain a rotation of liquid crystals in the liquid crystal display device according to an exemplary embodiment of the present disclosure. The liquid crystal display device 100 includes the gate electrode 130 on a lower substrate 171, a gate insulation layer 172 covering the gate electrode 130, the active layer, the source electrode 140, the drain electrode 150, an overcoating layer, a common electrode 173, an insulation layer 174, the pixel electrode 160G, an alignment film 175 for providing alignment controllability to liquid crystals 185R and 185G, a liquid crystal layer 180, an upper substrate 178, a black matrix 177, and color filters 176R and 176G.

FIG. 4 illustrates the red sub-pixel R and the green sub-pixel G. A red color filter 176R is included in the red sub-pixel R and a green color filter 176G is included in the green sub-pixel G. The liquid crystal layer 180 includes a plurality of liquid crystals 185R and 185G, and the liquid crystals 185R and 185G may be negative liquid crystals or positive liquid crystals. Herein, tilt angles of the pixel electrodes 160R and 160G may be set differently depending on the type of the liquid crystals.

If a data signal is applied to the pixel electrode 160G, the liquid crystals 186R and 185G are rotated. FIG. 4 illustrates rotations of the liquid crystals 185R and 185G when voltages for displaying gray scales representing color other than gray color are respectively applied to the pixel electrode 160R of the red sub-pixel R and the pixel electrode 160G of the green sub-pixel G.

Referring to FIG. 4, the liquid crystals indicated by dotted lines represent liquid crystals in black state, and the liquid crystals 185R and 185G indicated by solid lines represent liquid crystals after a data signal is applied to the pixel electrode 160G. The pixel electrode 160G in the red sub-pixel is applied with a data signal having a high voltage for displaying a gray scale of, e.g., G255. The pixel electrode 160G in the green sub-pixel is applied with a data signal having a voltage for displaying a gray scale of, e.g., G191.

In the crystal display device 100 according to an exemplary embodiment of the present disclosure, a tilt angle of the pixel electrode 160G in the green sub-pixel is greater than a tilt angle of the pixel electrode 160G in the red sub-pixel. Therefore, even if a data signal having a higher voltage is applied to the pixel electrode 160G in the red sub-pixel, rotation times of the liquid crystals 185R and 185G in the two sub-pixels are substantially the same.

Further, preferably, a difference in liquid crystal rotation times between sub-pixels is 8 μs or less at all gray scales. To this end, the pixel electrodes 160G in the respective sub-pixels may respectively have different tilt angles.

Figure 5:
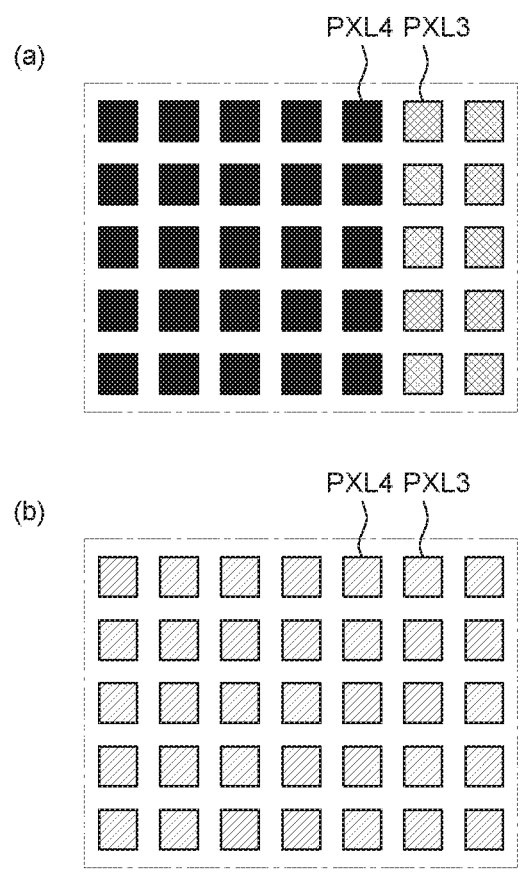
FIG. 5 provides schematic diagrams to explain a change of pixels in a liquid crystal display device according to an exemplary embodiment of the present disclosure.

FIG. 5 provides schematic diagrams provided to explain a change of pixels in a liquid crystal display device according to an exemplary embodiment of the present disclosure. The liquid crystal display device illustrated in FIG. 5 is the same as the liquid crystal display device in which the pixel electrodes in the green sub-pixel and the blue sub-pixel have a tilt angle of about 15 degrees and the pixel electrode in the red sub-pixel has a tilt angle of about 10 degrees, as illustrated in FIG. 2 through FIG. 4.

Portion(a) of FIG. 5 illustrates a plurality of exemplary pixels, and illustrates pixels PXL3 of a specific color with an RGB value of, e.g., (255, 191, 63) and pixels PXL4 in black state with an RGB value of, e.g., (0, 0, 0). Herein, a pattern that enables the pixels PXL4 in black state to have the color with the RGB value (255, 191, 63) may be applied.

As described above with reference to FIG. 2 through FIG. 4, tilt angles of the respective pixel electrodes are set such that liquid crystal rotation times in the respective sub-pixels are substantially the same. Thus, a desired color is immediately displayed. The red sub-pixel has a liquid crystal rotation time of about 13 μs and the green sub-pixel and the blue-sub pixel have liquid crystal rotation times of 20 μs or less. That is, the liquid crystals in all of the sub-pixels are rotated within a time difference of 8 μs, and, thus, a user can recognize a preset color without recognition of an undesired color.

The exemplary embodiments of the present disclosure can also be described as follows:

According to an aspect of the present disclosure, a liquid crystal display device includes: a first pixel electrode of which at least a part is extended in a first direction; and a second pixel electrode of which at least a part is extended in a second direction different from the first direction. The first pixel electrode and the second pixel electrode are included in the same pixel and respectively disposed in different sub-pixels.

The first pixel electrode includes a first sub-electrode extended in the first direction and a second sub-electrode extended in a direction symmetrical to the first direction on the basis of an axis. The second pixel electrode includes a third sub-electrode extended in the second direction and a fourth sub-electrode extended in a direction symmetrical to the second direction on the basis of the axis.

Each of the first pixel electrode and the second pixel electrode further includes a ←-shaped connection sub-electrode that connects the first sub-electrode and the second sub-electrode and connects the third sub-electrode and fourth sub-electrode. The connection sub-electrodes of the first pixel electrode and the second pixel electrode have the same shape.

A difference in angle between the first direction and the second direction is from 3 degrees to 7 degrees.

The liquid crystal display device further includes: a red color filter disposed on the first pixel electrode; and a green color filter or a blue color filter disposed on the second pixel electrode. A tilt angle of the first pixel electrode is smaller than a tilt angle of the second pixel electrode.

The first pixel electrode and the second pixel electrode have the same size, and a width of the second pixel electrode is smaller than a width of the first pixel electrode.

The liquid crystal display device further includes: a first thin film transistor electrically connected to the first pixel electrode; and a second thin film transistor electrically connected to the second pixel electrode. A portion where the first pixel electrode is connected to the first thin film transistor and a portion where the second pixel electrode is connected to the second thin film transistor have the same structure.

The liquid crystal display device further includes: a liquid crystal layer disposed on the first pixel electrode and the second pixel electrode and including a plurality of liquid crystals. When voltages for displaying gray scales other than gray color are respectively applied to the first pixel electrode and the second pixel electrode, liquid crystals on the first pixel electrode and liquid crystals on the second pixel electrode have the substantially same rotation time.

A difference in rotation times between the liquid crystals on the first pixel electrode and the liquid crystals on the second pixel electrode is 8 μs or less at all gray scales.

According to another feature of the present disclosure, the liquid crystals are negative liquid crystals or positive liquid crystals.

According to another aspect of the present disclosure, a liquid crystal display device includes: a pixel array including a plurality of pixels with a plurality of sub-pixels; and a color filter corresponding to the pixel array. Each of the plurality of sub-pixels includes a pixel electrode extended in a direction determined in order for at least some of the plurality of sub-pixels to respectively have different liquid crystal rotation times when the same voltage is applied.

When voltages for displaying gray scales other than gray color are respectively applied to the pixel electrodes of the plurality of sub-pixels, liquid crystal rotation times in the plurality of sub-pixels are the same.

Although the exemplary embodiments of the present disclosure have been described in detail with reference to the accompanying drawings, the present disclosure is not limited thereto and may be embodied in many different forms without departing from the technical concept of the present disclosure. Therefore, the exemplary embodiments of the present disclosure are provided for illustrative purposes only but not intended to limit the technical concept of the present disclosure. The scope of the technical concept of the present disclosure is not limited thereto. Therefore, it should be understood that the above-described exemplary embodiments are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:

1. A liquid crystal display device comprising:
    a first pixel electrode of which at least a part is extended in a first direction;
    a second pixel electrode of which at least a part is extended in a second direction different from the first direction;
    a red color filter on the first pixel electrode; and
    a green color filter or a blue color filter on the second pixel electrode,
    wherein the first pixel electrode and the second pixel electrode are included in a same pixel and respectively disposed in different sub-pixels,
    the first pixel electrode and the second pixel electrode have a same size, and
    a width of the second pixel electrode is greater than a width of the first pixel electrode.

2. The liquid crystal display device according to claim 1, wherein the first pixel electrode includes a first sub-electrode extended in the first direction and a second sub-electrode extended in a direction symmetrical to the first direction on a basis of an axis, and
    the second pixel electrode includes a third sub-electrode extended in the second direction and a fourth sub-electrode extended in a direction symmetrical to the second direction on the basis of the axis.

3. The liquid crystal display device according to claim 2, wherein each of the first pixel electrode and the second pixel electrode further includes a ←-shaped connection sub-electrode that connects the first sub-electrode and the second sub-electrode and connects the third sub-electrode and fourth sub-electrode, and
wherein the connection sub-electrodes of the first pixel electrode and the second pixel electrode have a same shape.

4. The liquid crystal display device according to claim 1, wherein a difference in angle between the first direction and the second direction is between 3 degrees and 7 degrees.

5. The liquid crystal display device according to claim 1, wherein a tilt angle of the first pixel electrode is smaller than a tilt angle of the second pixel electrode.

6. The liquid crystal display device according to claim 1, further comprising:
a first thin film transistor electrically connected to the first pixel electrode; and
a second thin film transistor electrically connected to the second pixel electrode,
wherein a portion where the first pixel electrode is connected to the first thin film transistor and a portion where the second pixel electrode is connected to the second thin film transistor have a same structure.

7. The liquid crystal display device according to claim 1, further comprising:
a liquid crystal layer on the first pixel electrode and the second pixel electrode and including a plurality of liquid crystals,
wherein when voltages for displaying gray scales other than gray color are respectively applied to the first pixel electrode and the second pixel electrode, a difference in rotation times between liquid crystals on the first pixel electrode and liquid crystals on the second pixel electrode is 8 μs or less at a specific color gray scale.

8. The liquid crystal display device according to claim 7, wherein the difference in rotation times between the liquid crystals on the first pixel electrode and the liquid crystals on the second pixel electrode is 8 μs or less at all gray scales.

9. The liquid crystal display device according to claim 7, wherein the liquid crystals are negative liquid crystals or positive liquid crystals.

10. A liquid crystal display device comprising:
a first pixel electrode including a first sub-electrode extended and tilted at a first angle on a basis of a direction orthogonal to a gate line and a second sub-electrode extended in a direction symmetrical to an extension direction of the first sub-electrode on a basis of a direction parallel with the gate line;
a second pixel electrode including a third sub-electrode extended and tilted at a second angle on the basis of the direction orthogonal to the gate line and a fourth sub-electrode extended in a direction symmetrical to an extension direction of the third sub-electrode on the basis of the direction parallel with the gate line, the first pixel electrode and the second pixel electrode having a same size, and a width of the second pixel electrode greater than a width of the first pixel electrode; and
a red color filter on the first pixel electrode and a green color filter or a blue color filter on the second pixel electrode, and
wherein the second angle is greater than the first angle.

11. The liquid crystal display device according to claim 10, wherein a difference between the first angle and the second angle is between 3 degrees and 7 degrees.

12. The liquid crystal display device according to claim 10, wherein each of the first pixel electrode and the second pixel electrode further includes a ←-shaped connection sub-electrode that connects the first sub-electrode and the second sub-electrode and connects the third sub-electrode and fourth sub-electrode, and
wherein the connection sub-electrode is tilted at a third angle on the basis of the direction orthogonal to the gate line, and
the third angle is greater than the first angle and the second angle.

13. The liquid crystal display device according to claim 10, wherein the first pixel electrode and the second pixel electrode are included in a same pixel and respectively disposed in different sub-pixels, and
the first angle and the second angle determined in order for at least some of the sub-pixels to respectively have different liquid crystal rotation times when a same voltage is applied.

14. The liquid crystal display device according to claim 10, wherein a width of the first pixel electrode and a width of the second pixel electrode are adjusted such that the first pixel electrode and the second pixel electrode have a same size, when a first direction of the first pixel electrode and a second direction of the second pixel electrode change.

15. The liquid crystal display device according to claim 10, wherein that the first pixel electrode and the second pixel electrode have a same size such that parasitic capacitance Cdp and transistor charging characteristics are kept uniform between sub-pixels, when a first direction of the first pixel electrode and a second direction of the second pixel electrode change.

* * * * *